US012710370B2

(12) United States Patent
Shigekawa et al.

(10) Patent No.: US 12,710,370 B2
(45) Date of Patent: Aug. 18, 2026

(54) RAMAN SCATTERED LIGHT MEASUREMENT SYSTEM AND RAMAN SCATTERED LIGHT MEASUREMENT METHOD

(71) Applicant: Bio-Xcelerator, Inc., Tokyo (JP)

(72) Inventors: Hidemi Shigekawa, Tsukuba (JP); Yusuke Arashida, Tsukuba (JP)

(73) Assignee: Bio-Xcelerator, Inc., Tokyo (JP)

( * ) Notice: Subject to any disclaimer, the term of this patent is extended or adjusted under 35 U.S.C. 154(b) by 110 days.

(21) Appl. No.: 18/709,193

(22) PCT Filed: Oct. 4, 2022

(86) PCT No.: PCT/JP2022/037075
§ 371 (c)(1),
(2) Date: May 10, 2024

(87) PCT Pub. No.: WO2023/084946
PCT Pub. Date: May 19, 2023

(65) Prior Publication Data

US 2025/0003881 A1 Jan. 2, 2025

(30) Foreign Application Priority Data

Nov. 12, 2021 (JP) ................................ 2021-185303

(51) Int. Cl.
*G01N 21/65* (2006.01)

(52) U.S. Cl.
CPC ... *G01N 21/65* (2013.01); *G01N 2201/06113* (2013.01)

(58) Field of Classification Search
CPC ..................................................... G01N 21/65
See application file for complete search history.

(56) References Cited

U.S. PATENT DOCUMENTS 6,151,522 A * 11/2000 Alfano ................ A61B 5/0084
600/475
7,106,436 B1 9/2006 Gord
(Continued)

FOREIGN PATENT DOCUMENTS

JP 2005062155 3/2005
JP 2017-020968 1/2017
(Continued)

OTHER PUBLICATIONS

2010. Triple-frequency symmetric subtraction scheme for nonresonant background suppression in coherent anti-Stokes Raman scattering (CARS) microscopy. Optics Express, 18(15), pp. 15714-15724 (Year: 2010).*

(Continued)

*Primary Examiner* — Michelle M Iacoletti
*Assistant Examiner* — Mohamed Doumbia
(74) *Attorney, Agent, or Firm* — Muncy, Geissler, Olds & Lowe, P.C.

(57) ABSTRACT

A Raman scattered light measurement system includes a Stokes light generation unit configured to generate broadband Stokes light, a pump light generation unit configured to generate narrowband pump light, and a wavelength change unit configured to change a center wavelength of the pump light in two different wavelengths.

12 Claims, 11 Drawing Sheets

(56) References Cited

U.S. PATENT DOCUMENTS

| | | | | |
|---|---|---|---|---|
| 2008/0059135 | A1* | 3/2008 | Murugkar | G01J 3/4338 703/11 |
| 2011/0109909 | A1* | 5/2011 | Wu | G01J 3/26 362/19 |
| 2011/0143391 | A1* | 6/2011 | Maquelin | G01N 21/65 435/34 |
| 2016/0178439 | A1* | 6/2016 | Freudiger | G01J 3/44 356/301 |
| 2018/0073981 | A1 | 3/2018 | Inoue | |
| 2021/0218215 | A1* | 7/2021 | Misawa | G02B 27/1006 |

FOREIGN PATENT DOCUMENTS

| | | | | |
|---|---|---|---|---|
| JP | 2018-045229 | | 3/2018 | |
| WO | 2014/205007 | A1 | 12/2014 | |
| WO | WO-2016009548 | A1 * | 1/2016 | G01N 21/65 |

OTHER PUBLICATIONS

International Search Report of the corresponding WO application No. PCT/JP2022/037075 mailed Dec. 13, 2022 and English translation thereof.

Green, "A dual-pump CARS system for the simultaneous detection of nitrogen and methane", Jan. 31, 1997, Urbana, Illinois Retrieved from the Internet:URL:https://www.proquest.com/docview/304353575?pq-igsite=gscholar&fromopenview=true&sourcetype=Dissertations%20&%20Theses.

The extended European search report dated Sep. 22, 2025 issued in EP counterpart application No. 22892446.0.

* cited by examiner

S
11
SC LIGHT SOURCE
12
MODE–LOCKED LASER
HIGHLY NONLINEAR FIBER
13
20
24
21
25
INCIDENT ANGLE CHANGING DEVICE
9
26
22
23
15
CALCULATION DEVICE
MEASUREMENT DEVICE
144
CALCULATION UNIT
143
AD CONVERTER
142
OPTICAL SENSOR
141
SPECTRO–METER
14

$E_{CARS} > E_{NRB}$
$E_{CARS} \ll E_{NRB}$
INTENSITY
INTENSITY
$\Omega_i$
$\Omega_i$
FREQUENCY
FREQUENCY S
15
CALCULATI
ON DEVICE
9
MEASUREMENT
DEVICE
26
CALCULATION
UNIT
144
AD
CONVERTER
143
OPTICAL
SENSOR
142
SPECTRO-
METER
141
14
11-1
FIRST LIGHT
SOURCE
11-2
SECOND LIGHT
SOURCE
28-1
11-3
THIRD LIGHT
SOURCE
28-2
22
23

11-1
FIRST LIGHT SOURCE
11-4
FOURTH LIGHT SOURCE
24
INCIDENT ANGLE CHANGING DEVICE
25
22
23
26
9
S
15
CALCULATI ON DEVICE
MEASUREMENT DEVICE
CALCULATION UNIT
144
AD CONVERTER
143
OPTICAL SENSOR
142
SPECTRO-METER
141
14

S2
50
EXCITATION LIGHT SOURCE
51
53
52
15
CALCULATI ON DEVICE
11
SC LIGHT SOURCE
12
MODE-LOCKED LASER
HIGHLY NONLINEAR FIBER
13
20
24
25
INCIDENT ANGLE CHANGING DEVICE
9
MEASUREMENT DEVICE
21
26
CALCULATION UNIT
144
AD CONVERTER
143
OPTICAL SENSOR
142
SPECTRO-METER
141
22
23
14

S3
11
SC LIGHT SOURCE
12
MODE-LOCKED LASER
HIGHLY NONLINEAR FIBER
13
20
61
24
25
INCIDENT ANGLE CHANGING DEVICE
21
22
62
23
9
26
15
CALCULATION DEVICE
MEASUREMENT DEVICE
144
CALCULATION UNIT
143
AD CONVERTER
142
OPTICAL SENSOR
141
SPECTRO-METER
14

RAMAN SCATTERED LIGHT MEASUREMENT SYSTEM AND RAMAN SCATTERED LIGHT MEASUREMENT METHOD

TECHNICAL FIELD

The present invention relates to a Raman scattered light measurement system and a Raman scattered light measurement method.

BACKGROUND ART

Information obtained by measuring Raman scattered light is used in various technical fields, and is also widely used for biological cell observation. In the observation of cells, observation using a fluorescent substance is widely known, but there is a problem that the observation target is considerably affected. Patent Literature 1 discloses a coherent Raman scattering microscope including: a first pulse laser generation unit that generates first pulsed light having a first wavelength component; a second pulse laser generation unit that generates second pulsed light having a second wavelength component different from the first wavelength component; an irradiation unit that simultaneously irradiates a sample with the first pulsed light and the second pulsed light; a condensing unit that condenses scattered light generated from the sample; a wavelength band blocking unit that blocks at least the first wavelength component and the second wavelength component from the condensed scattered light and allows coherent Raman scattered light to pass therethrough; and a detection unit that detects the coherent Raman scattered light, in which the wavelength band blocking unit includes a spectroscopic unit.

CITATION LIST

Patent literature

Patent Document 1: JP-A-2005-062155

SUMMARY OF INVENTION

Technical Problem

In the invention described in Patent Document 1, it is not easy to distinguish peaks in the Raman spectrum.

Solution to Problem

According to the 1st aspect of the present invention, a Raman scattered light measuring system includes; a Stokes light generator configured to generate Stokes light with a broad band; a pump light generator configured to generate pump light with a narrow band; and a wavelength changing unit configured to change the center wavelength of the pump light in two different wavelengths.

According to the 2nd aspect of the present invention, a Raman scattering light measuring method includes: generating broadband Stokes light; generating narrowband pump light; changing a center wavelength of the pump light in two different wavelengths; measuring a signal intensity for each frequency of reflected light obtained by irradiating a sample with the pump light and the Stokes light; and calculating a difference in the signal intensity for each frequency before and after the center wavelength of the pump light is changed.

Advantageous Effects of Invention

According to the present invention, a peak in a Raman spectrum can be easily identified.

DESCRIPTION OF EMBODIMENTS

First Embodiment

Hereinafter, a first embodiment of a Raman scattered light measurement system according to the present invention will be described with reference to FIGS. 1 to 7.

(Configuration)

Figure 1:
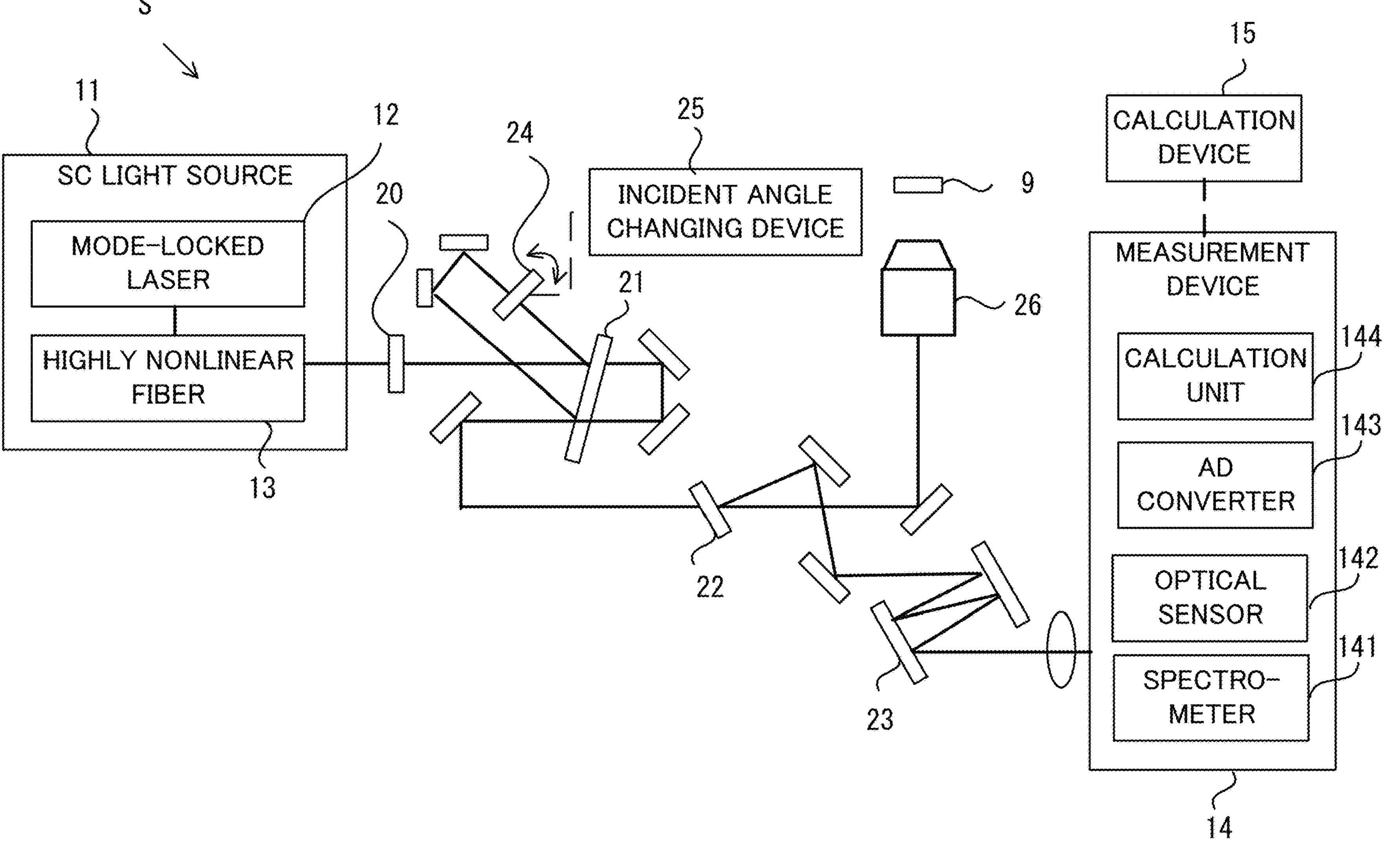
FIG. 1 is a block diagram of a Raman scattered light measuring system according to a first embodiment.

FIG. 1 is an overall configuration diagram of a Raman scattered light measurement system S. The Raman scattered light measurement system S includes an SC (Super Continuum) light source 11 that outputs SC light, an LPF (Long Pass Filter) 20 that filters a visible light component from the SC light, a first ULPF (Ultra LPF) 21 that divides the SC light into Stokes light Ls (angular frequency: ωs) and pump light Lp (angular frequency: ωp), a BPF 24 that narrows a frequency band of the pump light Lp, an incident angle changing device 25 that changes an incident angle of the pump light Lp to the BPF 24, an objective lens 26 that is disposed close to the sample 9, a second ULPF22 and a third ULPF23 that separate reflected light from the sample 9 and laser light, a measurement device 14 that measures the reflected light, and a calculation device 15 that processes a signal measured by the measurement device 14.

The SC light source 11 is a broadband pulse light source that emits strong light having a uniform phase over a wide wavelength range. The SC light source 11 includes a mode-locked laser 12 and a highly nonlinear fiber 13. The mode-locked laser 12 in the present embodiment has a center wavelength of 1064 nm and a pulse width of 5 pico-seconds. The wavelength of the SC light passing through the highly nonlinear fiber 13 is 400 nm to 2400 nm. The LPF 20 is a filter that transmits light whose wave number is longer than that of visible light and blocks light whose wave number is shorter than that of visible light.

The first ULPF 21 is an ultra steep long pass filter. The SC light L1 is divided into Stokes light Ls and pump light Lp by the first ULPF 21. Specifically, of the SC light L1, light having a wavelength longer than a predetermined threshold (for example, 1070 nm) is the Stokes light Ls, and light having a wavelength shorter than the predetermined threshold is the pump light Lp.

The BPF 24 is a filter that transmits only light having a predetermined wavelength, and the full width at half maximum of the transmitted light is, for example, 0.7 nm. The center wavelength of the pump light Lp transmitted through the BPF 24 is about 1064 nm, and the center wavelength of the transmitted pump light Lp is slightly changed according to the incident angle. In the present embodiment, the incident angle is set in two different wavelengths, and the center wavelength is changed by 0.4 nm. That is, the center wavelength of the pump light Lp in the present embodiment has two kinds of wavelengths: the wavelength $\lambda p+0.2$ nm and the wavelength $\lambda p-0.2$ nm. In the following description, in order to distinguish the pump light whose center wavelength is changed, the pump light having a shorter wavelength may be referred to as first pump light Lp1, and the pump light having a longer wavelength may be referred to as second pump light Lp2.

The incident angle changing device 25 changes the incident angle of the pump light Lp to the BPF 24 by changing the position or posture of the BPF 24. The incident angle changing device 25 is, for example, a galvano scanner to which the BPF 24 is mounted. The incident angle changing device 25 changes the incident angle of the pump light Lp to the BPF 24 at short time intervals based on an operation command from a controller (not shown). In FIG. 1, the incident angle changing device 25 is illustrated at a position separated from the BPF 24 for convenience of drawing, but the BPF 24 is actually mounted to the incident angle changing device 25.

The Stokes light Ls and the pump light Lp are combined by the first ULPF 21 after the optical path length is adjusted. By passing the combined light through the second ULPF22, light than having a wavelength shorter a predetermined value is blocked. The predetermined value is, for example, 1058 nm.

The objective lens 26 focuses the Stokes light Ls and the pump light Lp on the sample 9. The objective lens 26 guides the reflected light L4 obtained by irradiating the sample 9 with the Stokes light Ls and the pump light Lp to the second ULPF. Although the reflected light L4 is light reflected from the sample 9, the name of the reflected light L4 is different from that of the pump light Lp in order to distinguish the reflected light L4 from the pump light Lp. The sample 9 is placed on an XY stage (not shown), and an observation position of the sample 9, that is, a position where the Stokes light Ls and the pump light Lp are condensed can be adjusted by operating the XY stage.

The second ULPF22 and the third ULPF23 are ultra steep long pass filters. The second ULPF22 and the third ULPF23 separate the light applied to the sample 9, that is, the Stokes light Ls and the pump light Lp from the reflected light L4. However, a short pass filter having a steep edge at 1064 nm may be used instead of the second ULPF22 and the third ULPF23.

The measurement device 14 includes a spectrometer 141, an optical sensor 142, an AD converter 143, and a calculation unit 144. The spectrometer 141 is, for example, a prism. The spectrometer 141 spatially disperses light of various wavelengths included in the reflected light L4 for each wavelength and inputs the light to the optical sensor 142. The optical sensor 142 is a plurality of light receiving elements. When the optical sensor 142 is irradiated with the reflected light L4, each light receiving element generates a current in accordance with the intensity of the received light at predetermined time intervals. The optical sensor 142 is a photodiode array using a plurality of light receiving elements, for example, indium gallium arsenide (InGaAs) having sensitivity to a frequency to be measured, high saturation light detection intensity, and fast response.

The AD converter 143 converts the current generated by the optical sensor 142, that is, an analog signal into a digital signal and outputs the digital signal to the calculation unit 144. The digital signal indicates the signal intensity of a specific frequency included in the reflected light L4. The calculation unit 144 is, for example, a microcomputer. The calculation unit 144 arranges the digital signal output from the AD converter 143 into a predetermined format, and outputs information on the signal intensity for each frequency of the reflected light L4 to the calculation device 15. Hereinafter, the information of the signal intensity for each frequency of the reflected light L4 is also referred to as a "signal intensity measurement value". However, the wavelength may be used instead of the frequency, or the amount of Raman shift may be used. For example, the calculation unit 144 may add the frequency information to the signal intensity information output from the AD converter 143 and output the information to the calculation device 15, or may rearrange the signal intensity information output from the AD converter 143 in descending or ascending order of frequency and output the information to the calculation device 15.

The calculation device 15 processes a plurality of signal strength measurement values measured by the measurement device 14. Specifically, the calculation device 15 evaluates the difference between the signal intensity measurement values using the two types of pump light Lp for each frequency. For example, the calculation device 15 evaluates a difference in signal intensity between the reflected light L4 when the center wavelength of the pump light Lp is set to the wavelength $\lambda p+0.2$ nm and the reflected light L4 when the center wavelength of the pump light Lp is set to the wavelength $\lambda p-0.2$ nm. The processing of the calculation device 15 will be described in detail later. The calculation device 15 may display the processing result or may record the processing result in the storage device. The display and recording by the calculation device 15 may be performed using only numerical values that directly indicate calculation results, or may be performed using a graph.

Figure 2:
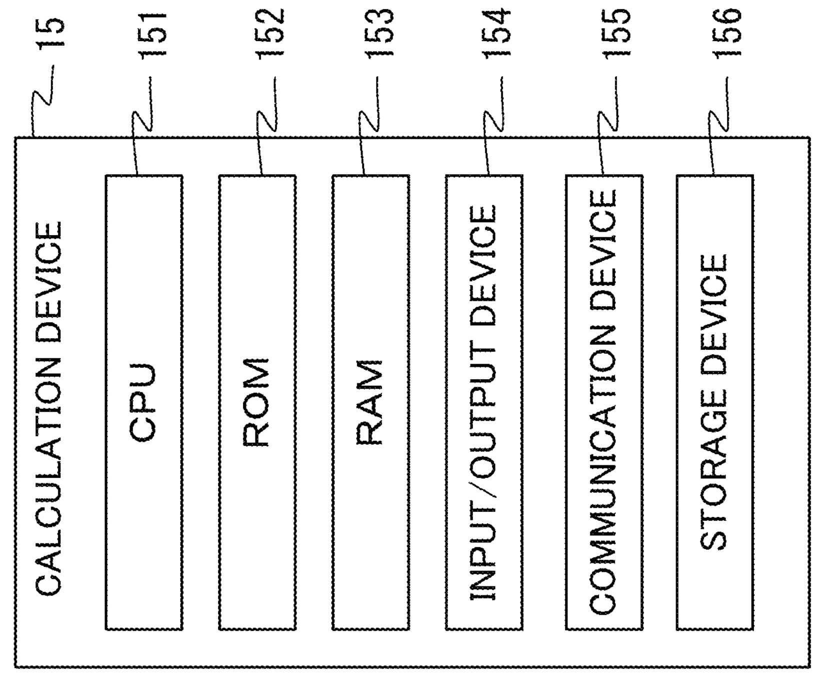
FIG. 2 is a hardware configuration diagram of a calculation device.

FIG. 2 is a hardware configuration diagram of the calculation device 15. The calculation device 15 includes a CPU 151 as a central processing unit, a ROM 152 as a read-only storage device, a RAM 153 as a readable/writable storage device, an input/output device 154 as a user interface, a communication device 155, and a storage device 156. The CPU 151 loads a program stored in the ROM 152 into the RAM 153 and executes the program to perform the above-described calculation.

The calculation device 15 may be realized by a field programmable gate array (FPGA) which is a rewritable logic circuit or an application specific integrated circuit (ASIC) which is an application specific integrated circuit, instead of the combination of the CPU 151, the ROM 152, and the RAM 153. Instead of the combination of the CPU 151, the ROM 152, and the RAM 153, the calculation device 15 may be implemented by a combination of different configurations, for example, a combination of the CPU 151, the ROM 152, the RAM 153, and an FPGA.

The input/output device 154 is a keyboard, a mouse, and a display. The input/output device 154 displays a calculation result of the CPU 151 and information stored in the storage device 156 on a display. The communication device 155 is a communication interface with the measurement device 14 and corresponds to a known communication standard such as IEEE802.3. The communication device 155 receives the measurement result from the measurement device 14 and stores the measurement result in the storage device 156. The storage device 156 is a nonvolatile storage device such as a flash memory or a hard disk drive. The measurement result measured by the measurement device 14 and the calculation result by the CPU 151 are stored in the storage device 156.

(Energy Diagram)

Figure 3:
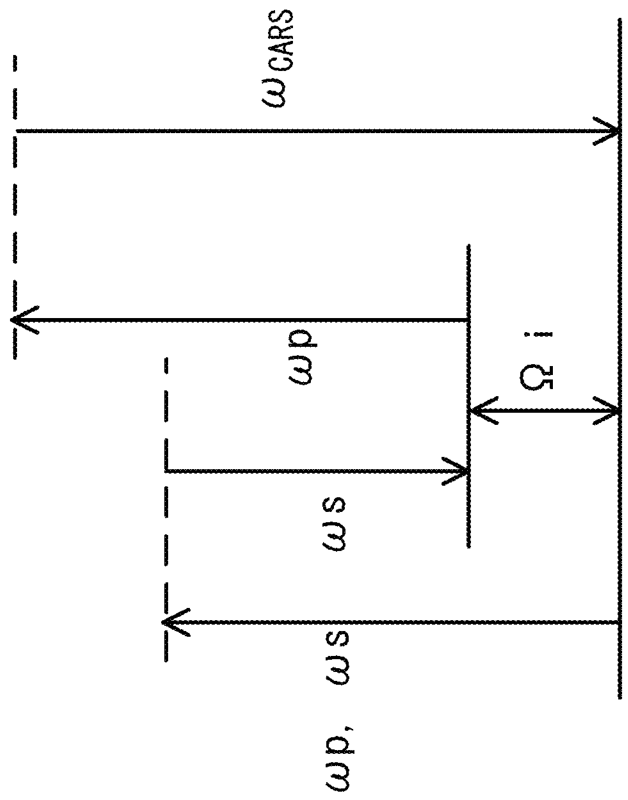
FIG. 3 is an energy diagram.

FIG. 3 is an energy diagram in the present embodiment. ωp and ωs are the energies of the pump light Lp and the Stokes light Ls, respectively, and Ωi is the energy corresponding to the angular frequency in the vibration mode of the sample 9.

(Wavelength of Pump Light Lp)

Figure 4:
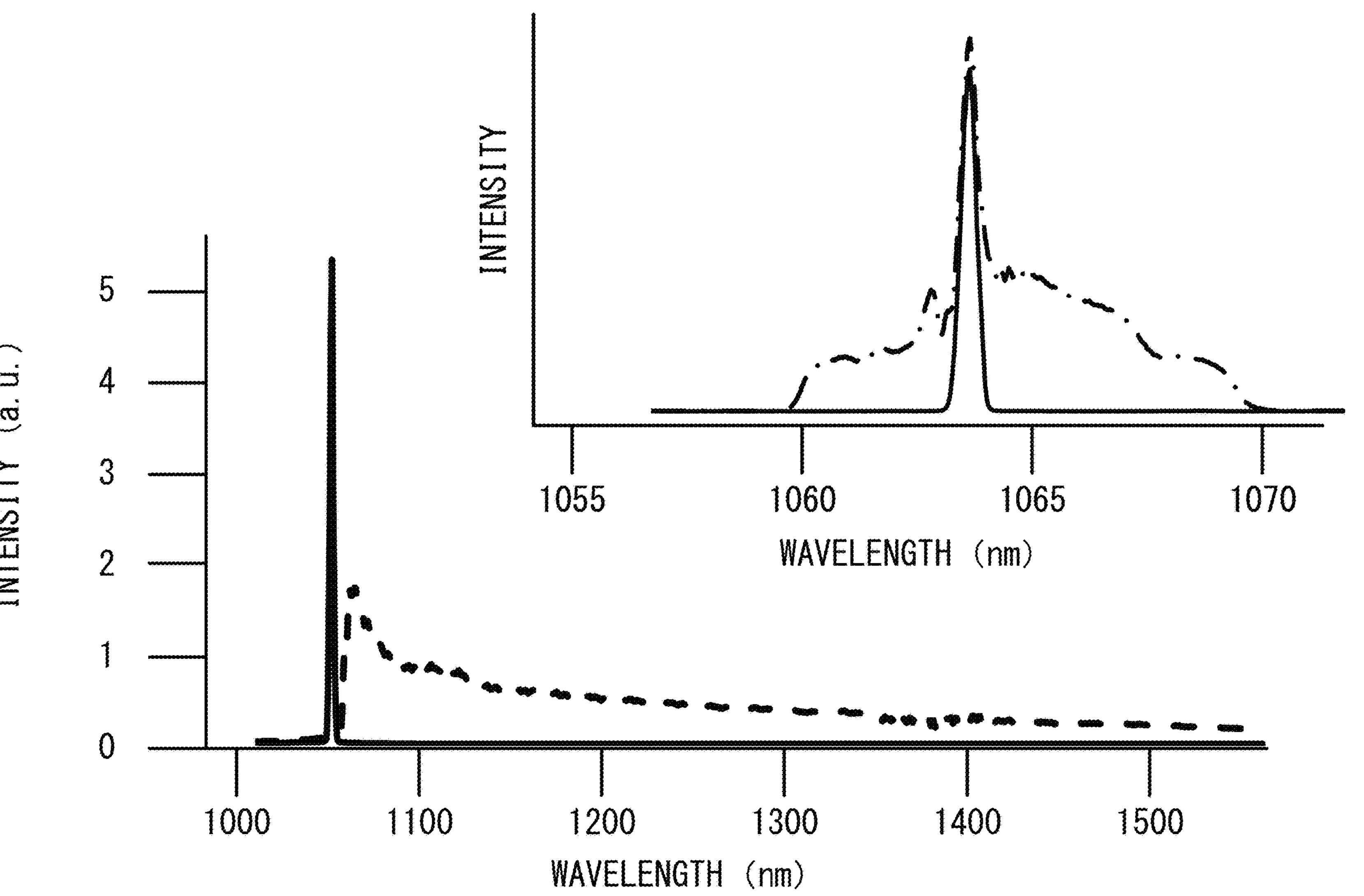
FIG. 4 is a graph showing wavelength characteristics of pump light and Stokes light.

FIG. 4 is a diagram illustrating wavelength characteristics of the pump light Lp and the Stokes light Ls. The upper right of FIG. 4 shows the wavelength characteristics of the pump light Lp before and after passing through the BPF 24. The pump light Lp indicated by the solid line in FIG. 4 has a high intensity at a specific wavelength, and the Stokes light Ls indicated by the broken line has a lower intensity than the pump light Lp in a wide wavelength range. In the upper right of FIG. 4, the pump light Lp before passing through the BPF 24 is indicated by a a dash-dotted line, and the pump light Lp after passing through the BPF 24 is indicated by a solid line. As shown in the upper right of FIG. 4, the wavelength is limited to a very narrow wavelength around about 1064 nm by passing through the BPF 24. As described above, the center wavelength of the pump light Lp is changed by 0.4 nm by changing the incident angle of the pump light Lp to the BPF 24 by moving or turning the BPF 24.

(Waveform)

Figure 5:
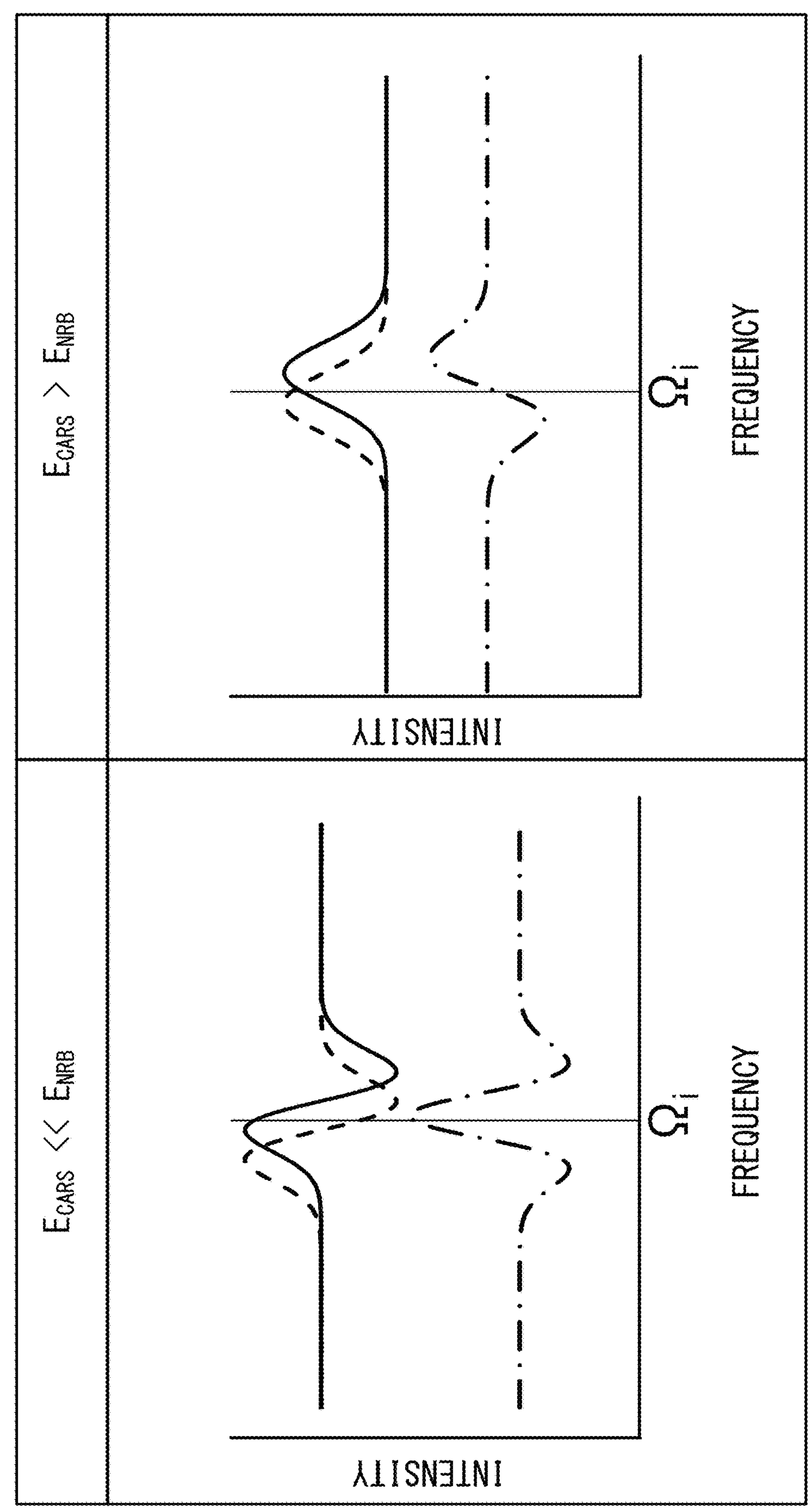
FIG. 5 is a graph showing the relationship between Ωi, which is the angular frequency in the vibration mode of the sample, and the CARS signal waveform.

FIG. 5 is a diagram showing the relationship between Ωi, which is the angular frequency in the vibration mode of the sample 9, and the CARS signal waveform. However, since the waveform differs depending on the magnitude relationship between the intensity of the CARS signal and the intensity of a non-resonant background (hereinafter referred to as "NRB") signal not related to Raman scattering, the waveforms are shown in different cases. The left side of FIG. 5 shows a waveform when the CARS signal is sufficiently weaker than the NRB signal, and the right side of FIG. 5 shows a waveform when the CARS signal is stronger than the NRB signal.

In FIG. 5, CARS signals corresponding to two types of pump light frequencies are shown together, a broken line indicates a CARS signal corresponding to the first pump light Lp1 having a low frequency, and a solid line indicates a CARS signal corresponding to the second pump light Lp2 having a high frequency. The dashed-dotted line shown in the lower part indicates the difference between the two CARS signals. When the CARS signal is sufficiently weaker than the NRB signal, the difference between the two CARS signals has a peak at the vibration frequency ωi as shown on the left of FIG. 5. On the other hand, when the CARS signal is larger than the NRB signal, a spectrum as shown on the right side of FIG. 5 appears at the vibration frequency ωi.

(Processing of Program)

Processing performed by the CPU 151 incorporated in the calculation device 15 will be described. The CPU 151 sets two signal intensity measurement values having the same conditions except for the pump light Lp and having different center wavelengths of the pump light Lp as processing targets, and calculates a difference in signal intensity for each frequency. For example, any one of the following three methods can be used to specify the processing target. In the calculation device 15, which of the following three methods is adopted may be set by the input/output device 154 or may be designated in advance.

The first method is a method of specifying a processing target in the order of data input from the measurement device 14 on the assumption that the order of measurement is determined in advance. For example, when it is assumed that the first pump light Lp1 and the second pump light Lp2 are alternately used and the measurement conditions of two consecutive measurements are the same except for the wavelength of the pump light, the calculation device 15 specifies a processing target and performs processing as follows. That is, the calculation device 15 calculates a difference between the first and second signal strength measurement values for each frequency, calculates a difference between the third and fourth signal strength measurement values for each frequency, and calculates a difference between the fifth and sixth signal strength measurement values for each frequency.

The second method is a method of receiving designation by an operator. For example, the signal strength measurement values received from the measurement device 14 are stored in the storage device 156 in advance, and the calculation device 15 calculate a difference in signal strength for each frequency with respect to a set of signal strength measurement values designated by the operator.

The third method is a method in which the calculation device 15 collects measurements and actively processes the measurements. In this case, the calculation device 15 can control at least the operations of the incident angle changing device 25 and the measurement device 14, and the calculation device 15 sets the incident angle changing device 25 to, for example, one of the first angle and the second angle. When the calculation device 15 sets the incident angle changing device 25 to the first angle and causes the measurement device 14 to perform measurement, the calculation device 15 sets the incident angle changing device 25 to the second angle and causes the measurement device 14 to perform measurement again. The calculation device 15 calculates the difference between the two signal strength measurement values thus obtained.

Figure 6:
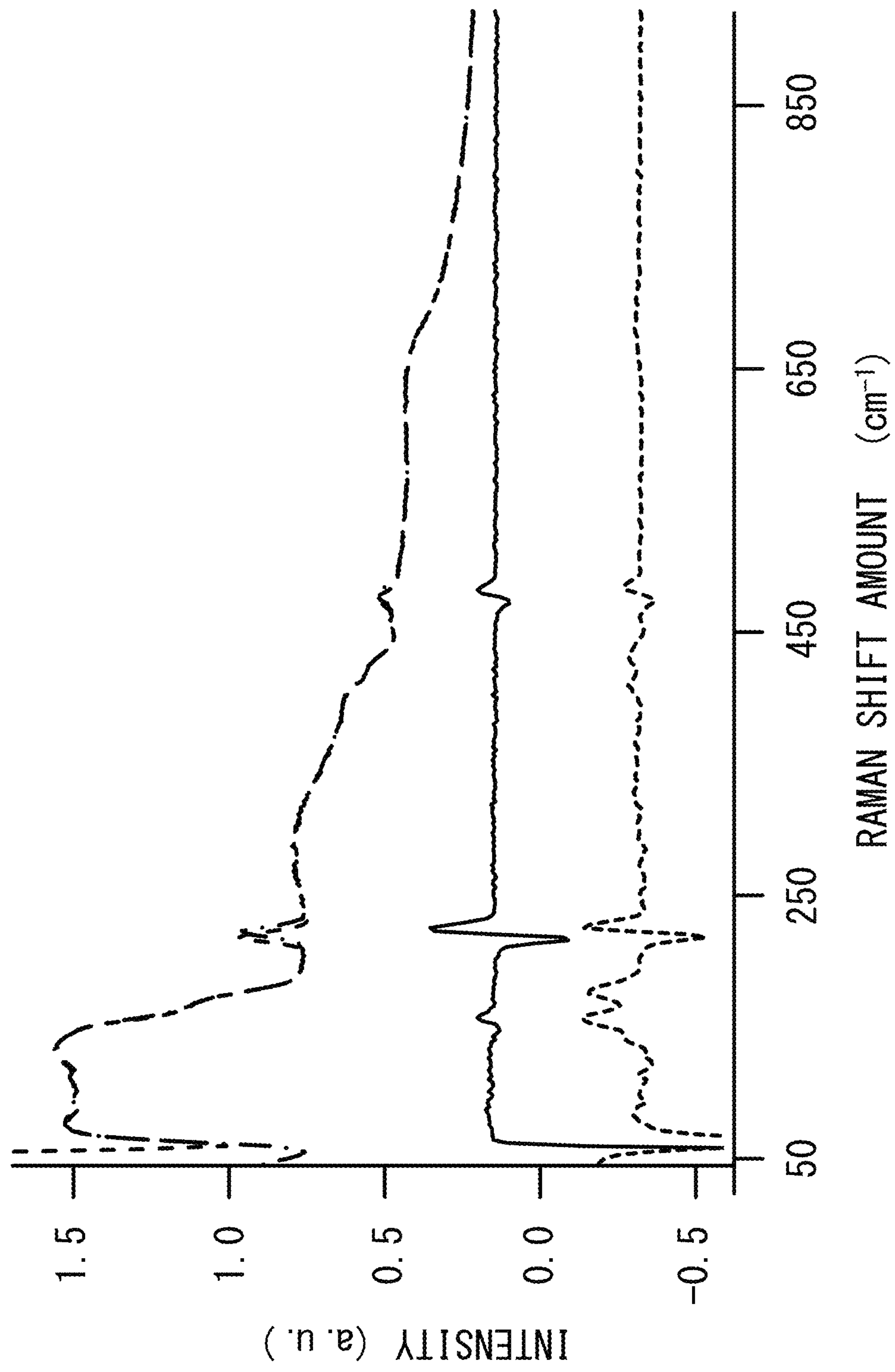
FIG. 6 is a diagram showing an operation by a calculation device.

FIG. 6 is a diagram illustrating calculation by the calculation device 15. In FIG. 6, the horizontal axis represents the amount of Raman shift, and the vertical axis represents the scattering intensity. In FIG. 6, a dash-dotted line indicates a CARS signal corresponding to the first pump light Lp1 having a low frequency, and a broken line indicates a CARS signal corresponding to the second pump light Lp2 having a high frequency. The values of the two CARS signals are substantially the same except for the vicinity of 50 $cm^{-1}$, and overlap in FIG. 6.

The solid line indicates the difference between the intensities of the two CARS signals for each amount of Raman shift, and is multiplied by 3 for convenience of drawing in FIG. 6. The broken line shown in the lower part of FIG. 6 is an amount obtained by numerically differentiating the CARS signal shown by the dash-dotted line by the amount of Raman shift.

From the measurement results indicated by the broken line and the dash-dotted line in the upper part of FIG. 6, it can be seen that there are peaks at 470 $cm^{-1}$ and 220 $cm^{-1}$. In addition, from the measurement results indicated by the broken line and the dash-dotted line, there are peaks at 150 $cm^{-1}$ and 70 $cm^{-1}$, but it is difficult to determine whether the peaks are present. From the calculation result indicated by the solid line, it can be confirmed that peaks are present at 470 $cm^{-1}$, 220 $cm^{-1}$, and 150 $cm^{-1}$, and no peak is present at 70 $cm^{-1}$. These three waveforms have shapes shown on the right side of FIG. 5, and it can be seen that they are not affected by interference. In the calculation result indicated by the broken line in the lower part of FIG. 6, peaks are present not only at 470 $cm^{-1}$, 220 $cm^{-1}$, and 150 $cm^{-1}$ but also at 170 $cm^{-1}$. The peak at 170 $cm^{-1}$ is over-detected, indicating that the peak cannot be properly detected by differentiation.

Figure 7:
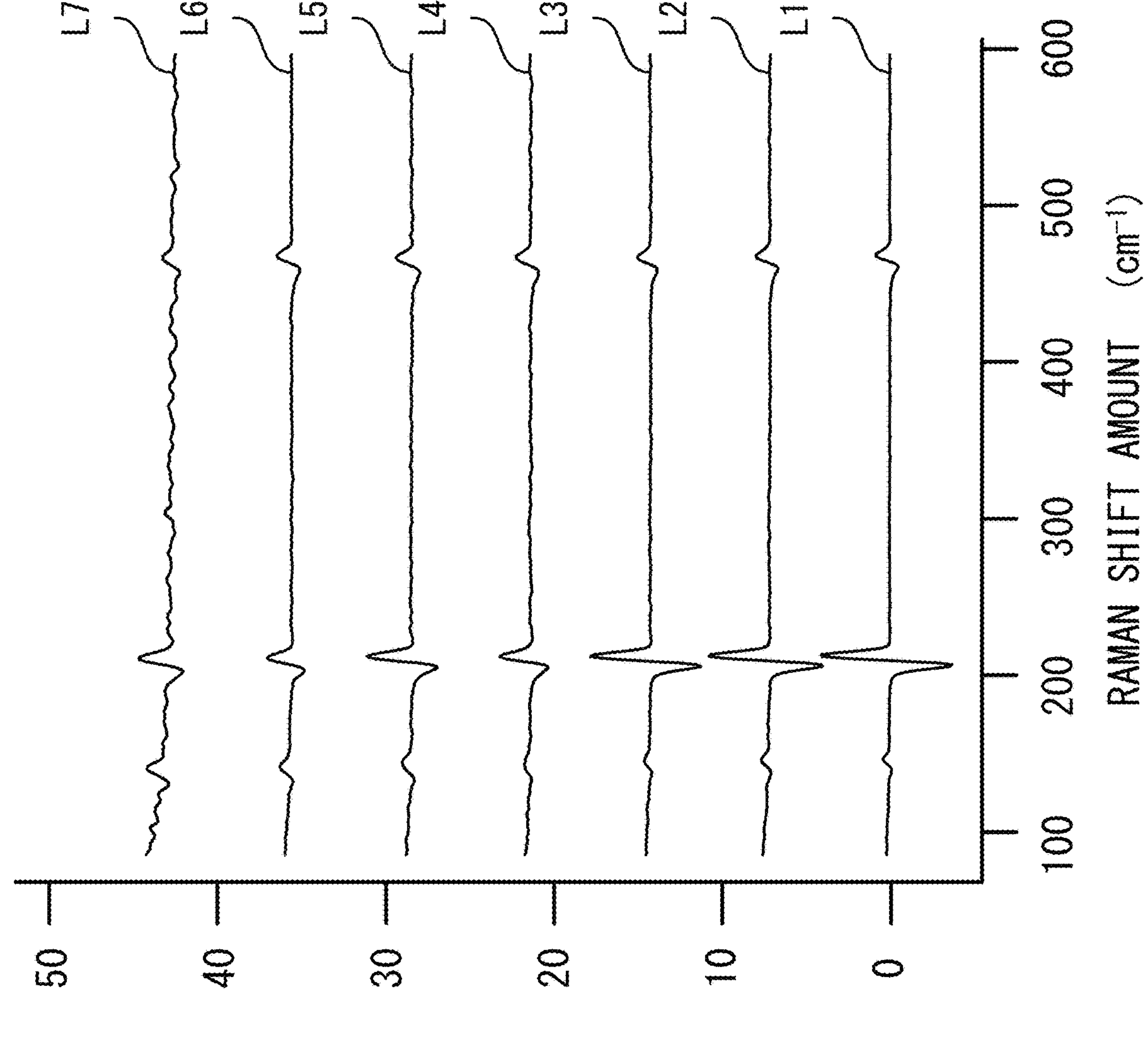
FIG. 7 is a graph showing a change in Raman scattering with respect to a change in temperature.

FIG. 7 is a diagram illustrating a result of calculating a change in Raman scattering with respect to a temperature change, specifically, a difference in signal intensity between a CARS signal corresponding to the first pump light Lp1 and a CARS signal corresponding to the second pump light Lp2 for each amount of Raman shift. Each spectrum is normalized by the intensity at 470 $cm^{-1}$. In FIG. 7, the sample 9 was measured at seven different temperatures from 25° C. to 120° C. Specifically, L1 shown in FIG. 7 corresponds to 25 degrees, and L7 corresponds to 120 degrees. The calculation result of 25 degrees in FIG. 7 is the same as the data indicated by the solid line in FIG. 6. It can be seen in FIG. 7 that the signal intensity at 470 $cm^{-1}$, 220 $cm^{-1}$ and 150 $cm^{-1}$ varies with temperature. Specifically, the signal at 150 $cm^{-1}$ increases as the temperature increases, and the signal at 220 $cm^{-1}$ decreases as the temperature increases.

In the present embodiment, as shown in FIG. 4, the broadband Stokes light Ls is generated by the SC light source 11, the LPF 20, and the first ULPF 21. Therefore, the SC light source 11, the LPF 20, and the first ULPF 21 can be collectively referred to as a "Stokes light generation unit". As shown in FIG. 4, the pump light Lp having a narrow band is generated by the SC light source 11, the LPF 20, the first ULPF 21, and the BPF 24. Therefore, the SC light source 11, the LPF 20, the first ULPF 21, and the BPF 24 can be collectively referred to as a "pump light generation unit". Further, the incident angle changing device 25 changes the center wavelength of the pump light Lp to two wavelengths, for example, 1064 nm+0.2 nm and 1064 nm−0.2 nm by moving or rotating the BPF 24. Therefore, the BPF 24 and the incident angle changing device 25 can be referred to as a "wavelength changing unit".

According to the first embodiment described above, the following effects can be obtained.

(1) The Raman scattered light measurement system S includes a Stokes light generation unit that generates broadband Stokes light Ls, a pump light generation unit that generates narrowband pump light Lp, and a BPF 24 and an incident angle changing 5 that are wavelength changing units that change the center wavelength of the pump light Lp in two different wavelengths. As described above, the Stokes light generation unit includes the SC light source 11, the LPF 20, and the first ULPF 21. The pump light generation unit includes the SC light source 11, the LPF 20, the first ULPF 21, and the BPF 24. Therefore, by calculating the difference between the reflected lights L4 obtained using the two pump lights Lp, the peak in the Raman spectrum can be easily determined as indicated by the solid line in FIG. 6.

(2) The Raman scattered light measurement system S includes a measurement device 14 that measures the signal intensity for each frequency of the reflected light L4 obtained by irradiating the sample 9 with the pump light Lp and the Stokes light Ls to obtain a signal intensity measurement value, and a calculation device 15 that calculates the difference between the signal intensity measurement values for each frequency before and after the incident angle changing device 25, which is a wavelength changing unit, changes the center wavelength of the pump light Lp. Therefore, as indicated by a solid line in FIG. 6, the peak in the Raman spectrum can be easily determined from the calculation result of the calculation device 15.

(3) The wavelength changing unit includes a BPF 24 disposed in the optical path of the pump light Lp, and an operation mechanism that moves or rotates the BPF 24, that is, an incident angle changing device 25. The incident angle changing device 25 moves or rotates the BPF 24 to change the incident angle of the pump light Lp incident on the BPF 24, thereby changing the wavelength of the pump light Lp. Therefore, the wavelength of the pump light Lp can be changed by rotating the BPF 24.

(4) An operation mechanism for operating the BPF 24 is a galvano scanner. Therefore, since the angle of the BPF 24 can be quickly changed, the measurement in which the center frequency of the pump light Lp is changed is completed in a short time. Therefore, in a case where a large number of measurements are performed, for example, in a case where a certain region is divided into 100 sections×100 sections and measurements are performed 10,000 times, the time required for the entire measurement can be shortened significantly.

(5) The pump light Lp and the Stokes light Ls are light in the infrared region. Therefore, the sample 9 is less likely to be damaged in the configuration according to the present embodiment than in a configuration in which visible light is used as the pump light Lp and the Stokes light Ls.

(6) The Raman-scattered light measurement method in the Raman-scattered light measurement system S includes generating broadband Stokes light Ls, generating narrowband pump light Lp, changing the center wavelength of the pump light Lp in two different wavelengths, measuring the signal intensity for each frequency of the reflected light L4 obtained by irradiating the sample 9 with the pump light Lp and the Stokes light Ls, and calculating the difference in signal intensity for each frequency before and after the center wavelength of the pump light Lp is changed. Therefore, the peak in the Raman spectrum can be easily identified.

(Modification 1)

In the first embodiment described above, light output from one SC light source 11 is used as the pump light Lp and the Stokes light Ls, and the pump light Lp is changed into the first pump light Lp1 and the second pump light Lp2 by changing the incident angle to the BPF 24. However, the Stokes light Ls, the first pump light Lp1, and the second pump light Lp2 may be output from different light sources.

Figure 8:
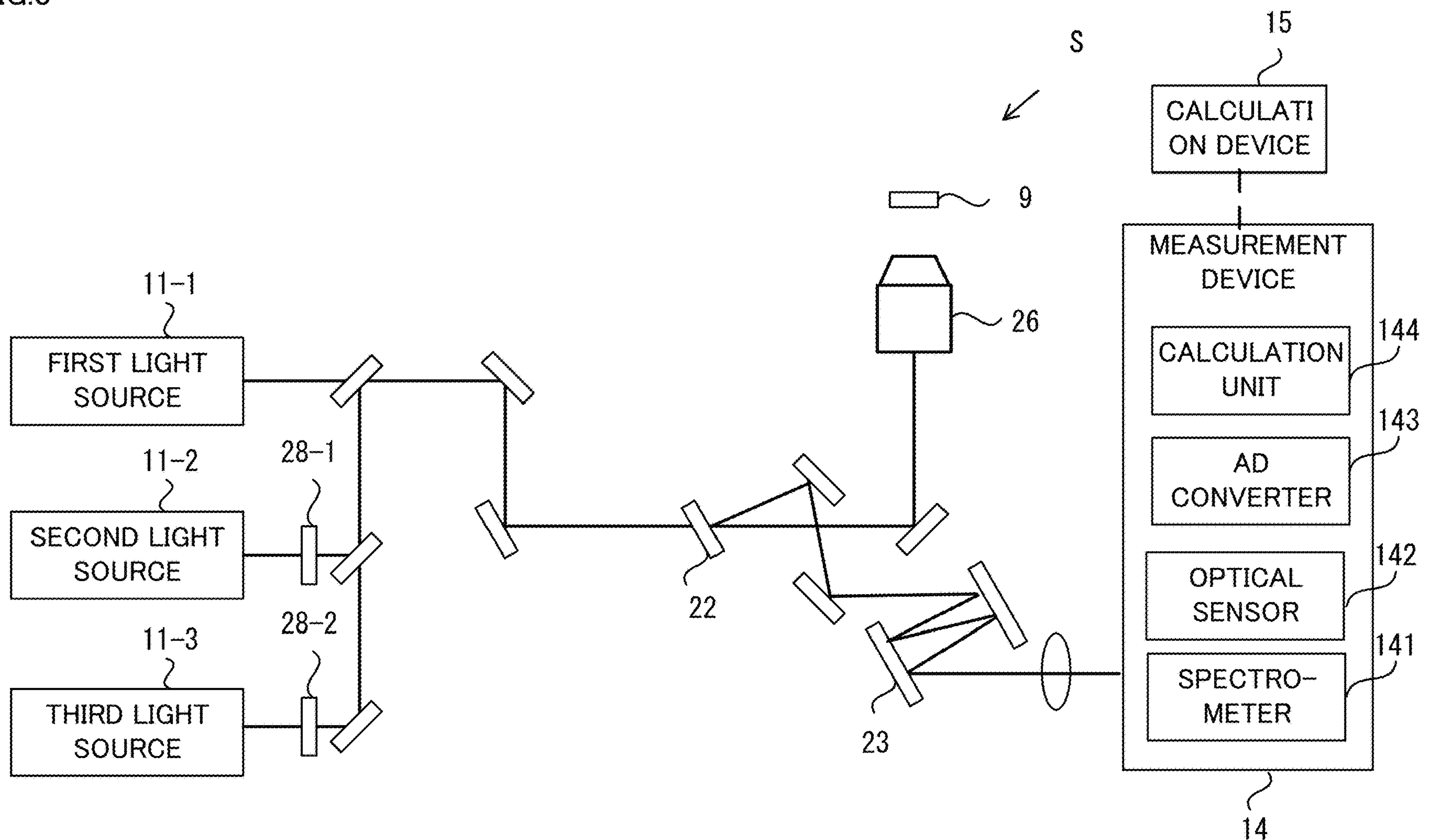
FIG. 8 is a block diagram of a Raman scattered light measuring system according to a first modification.

FIG. 8 is a configuration diagram of a Raman scattered light measurement system S according to a first modification. Comparing FIG. 8 with FIG. 1, a first light source 11-1, a second light source 11-2, a third light source 11-3, a first shutter 28-1, and a second shutter 28-2 are provided instead of the SC light source 11. In this modification, the BPF 24 disposed on the optical path of the pump light Lp in FIG. 1 is not provided, and the incident angle changing device 25 that moves or rotates the BPF 24 is not provided.

The first light source 11-1 outputs Stokes light Ls. The second light source 11-2 outputs the first pump light Lp1. The third light source 11-3 outputs the second pump light Lp2. The first shutter 28-1 and the second shutter 28-2 are open/close doors in which only one of them is opened at most at the same time. That is, in the present modification, one of the first pump light Lp1 and the second pump light Lp2 is selectively output depending on which of the first shutter 28-1 and the second shutter 28-2 is opened.

The first light source 11-1 can be realized by a combination of the SC light source 11, the LPF 20, and the first ULPF 21 in the first embodiment. The second light source 11-2 can be realized by a combination of the SC light source 11, the LPF 20, the first ULPF 21, and the BPF 24 in the first embodiment. The third light source 11-3 can be realized by a combination of the SC light source 11, the LPF 20, the first ULPF 21, and the BPF 24 in the first embodiment. However, the angle at which the light emitted from the second light source 11-2 enters the BPF 24 is set in advance to be different from the angle at which the light emitted from the third light source 11-3 enters the BPF 24.

The first shutter 28-1 and the second shutter 28-2 may be electric doors or rotary plates having slits. The first shutter 28-1 and the second shutter 28-2 may be integrally formed.

According to the present modification, the following effects can be obtained. (7) The Raman scattered light measurement system S includes a second light source 11-2 that outputs a first pump light whose center wavelength is a first wavelength, a third light source 11-3 that outputs a second pump light whose center wavelength is a second wavelength, and a first shutter 28-1 and a second shutter 28-2 that selectively irradiate the sample 9 with one of the two pump lights. Therefore, the same effect can be obtained with a configuration different from that of the first embodiment.

(Modification 2)

In the first modification described above, three light sources are used. However, two light sources of a light source that outputs the pump light Lp and a light source that outputs the Stokes light Ls may be used.

Figure 9:
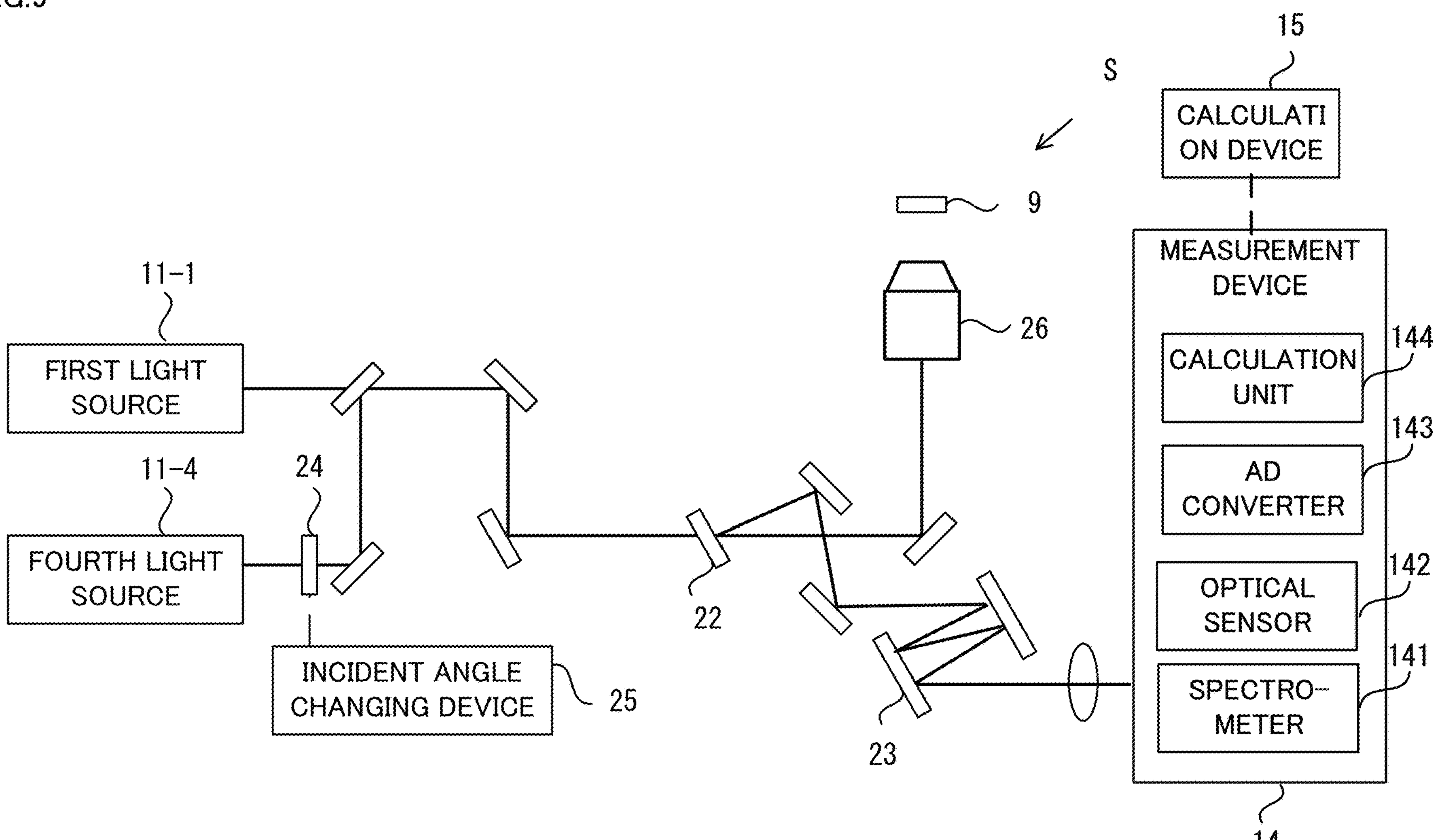
FIG. 9 is a block diagram of a Raman scattered light measuring system according to a second modification.

FIG. 9 is a configuration diagram of a Raman scattered light measurement system S according to a second modification. Comparing FIG. 9 with FIG. 1, a first light source 11-1 and a fourth light source 11-4 are provided instead of the SC light source 11. The function and configuration of the first light source 11-1 are the same as those of the first modification. The first light source 11-1 outputs Stokes light Ls.

The fourth light source 11-4 can be realized by a combination of the SC light source 11, the LPF 20, and the first ULPF 21 in the first embodiment. The pump light Lp output from the fourth light source 11-4 is guided to the same path as the Stokes light Ls after passing through the BPF 24. The BPF 24 is moved or rotated by the incident angle changing device 25 as in the first embodiment, and the angle at which the pump light Lp is incident on the BPF 24 is changed. As a result, the center wavelength of the pump light Lp is changed by, for example, 0.4 nm. According to the present modification, the same effect can be achieved with a configuration different from that of the first embodiment.

(Modification 3)

In the first embodiment described above, the incident angle changing device 25 is a galvano scanner that moves or rotates the BPF 24. However, the incident angle changing device 25 may be a rotation stage that rotates the BPF 24, or may be a single-axis or multi-axis stage that moves or rotates the BPF 24. Further, the incident angle changing device 25 may be a moving and rotating mechanism that moves or rotates a mirror (not illustrated) placed on an optical path until the pump light Lp reflected from the first ULPF 21 is incident on the BPF 24.

(Modification 4)

The calculation device 15 may detect amount of Raman shift having a peak in the signal intensity from the measurement result by the measurement device 14 and record the amount of Raman shift together with the signal intensity. For the detection of the peak, for example, pattern matching of a shape indicated by a dash-dotted line in FIG. 5 can be used.

(Modification 5)

In the first embodiment described above, light in the infrared region is used as the pump light Lp and the Stokes light Ls with which the sample 9 is irradiated. However, the wavelengths of the pump light Lp and the Stokes light Ls may be appropriately changed according to the type of the sample 9, the purpose of measurement, and the like. For example, the pump light Lp and the Stokes light Ls may be any combination of X-rays, ultraviolet rays, visible rays, infrared rays, and microwaves.

(Modification 6)

In the first embodiment described above, we showed an example of using BPF 24 to change the wavelength of pump light Lp to 1064 nm+0.2 nm and 1064 nm−0.2 nm, with a wavelength change range of ±0.2 nm. However, this wavelength is only one example, and other wavelengths may be used as the center wavelength, or the wavelength change range may be changed to any value other than ±0.2 nm. However, the wavelength change range is restricted by the full width at half maximum, which is a characteristic of the BPF 24 to be used. That is, it is necessary to increase the width of the wavelength to be changed as the full width at half maximum, which is a characteristic of the BPF 24 to be used, increases.

Second embodiment of the Raman scattered light measuring system will be described with reference to FIG. 10. In the following description, the same components as those of the first embodiment are denoted by the same reference signs, and differences will be mainly described. Points not particularly described are the same as those in the first embodiment. The present embodiment is different from the first embodiment mainly in that an optical amplifier that amplifies pump light is further provided.

Figure 10:
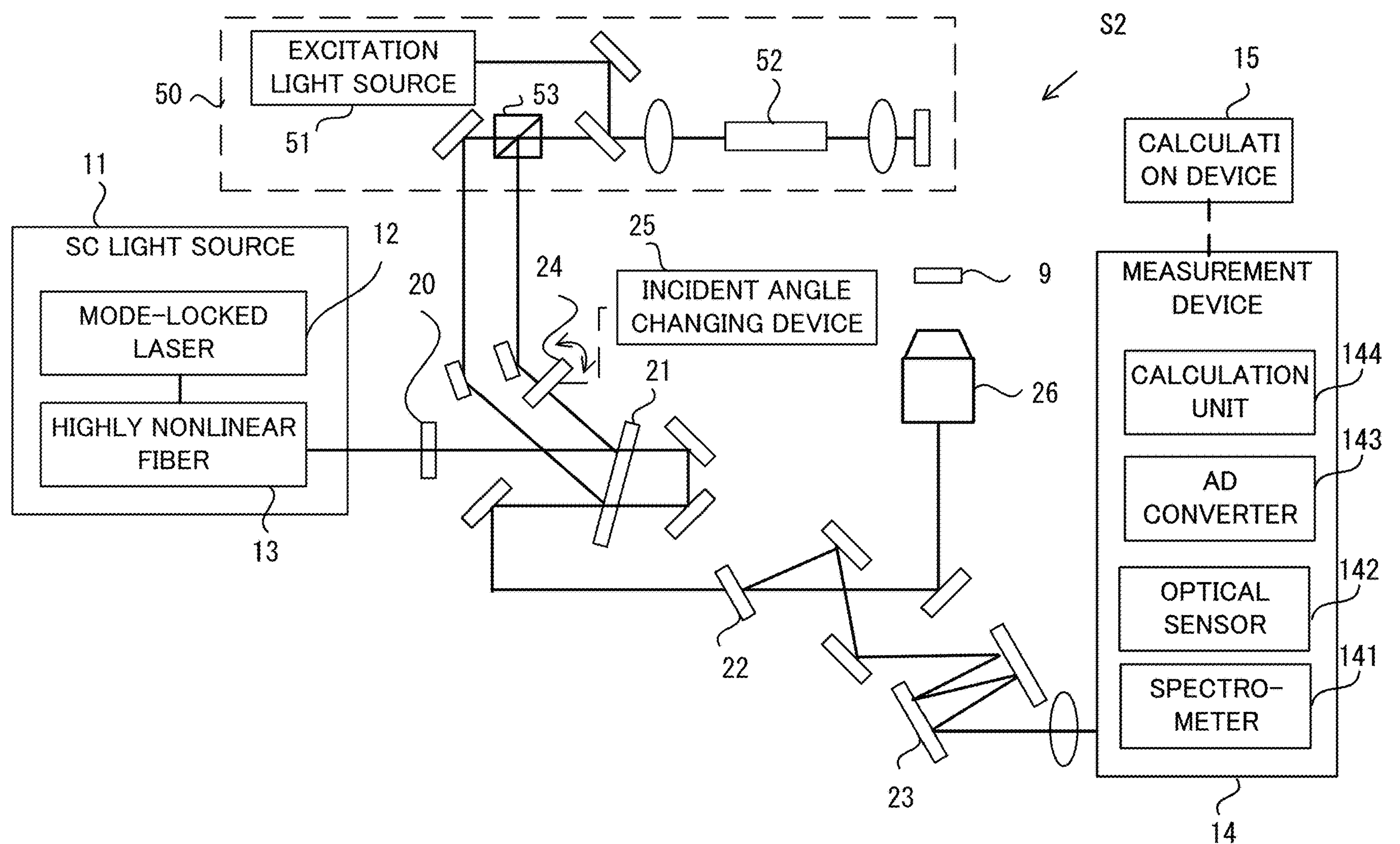
FIG. 10 is a block diagram of a Raman scattered light measuring system according to a second embodiment.

FIG. 10 is a configuration diagram of a Raman scattered light measurement system S2 according to the second embodiment. The Raman scattered light measurement system S2 in the present embodiment includes a pump light amplification unit 50 in addition to the configuration in the first embodiment. The pump light amplification unit 50 includes an excitation light source 51, an amplification medium 52, and a dichroic mirror 53. The excitation light source 51 is, for example, a continuously oscillating semiconductor laser having a wavelength of 808 nm. The laser light output from the excitation light source 51 excites the amplification medium 52. The amplification medium 52 is, for example, an Nd: YVO4 crystal.

In the present embodiment, the pump light Lp transmitted through the BPF 24 is guided to the dichroic mirror 53. The pump light Lp is amplified by the amplification medium 52 excited by the excitation light source 51, and the sample 9 is irradiated with the amplified pump light Lp. Since the Raman scattering signal is also amplified by amplifying the pump light Lp, there are advantages that the influence of noise is reduced and the exposure time can be reduced.

According to the second embodiment described above, the following effects can be obtained. (7) The pump light amplifier 50 amplifies the intensity of the pump light Lp. Therefore, the signal intensity of the reflected light L4 obtained by irradiation with the pump light Lp can be increased.

Third Embodiment

A third embodiment of the Raman scattered light measuring system will be described with reference to FIG. 11. In the following description, the same components as those of the first embodiment are denoted by the same reference numerals, and differences will be mainly described. Points not particularly described are the same as those in the first embodiment. The present embodiment is different from the first embodiment mainly in that interference measurement is performed.

Figure 11:
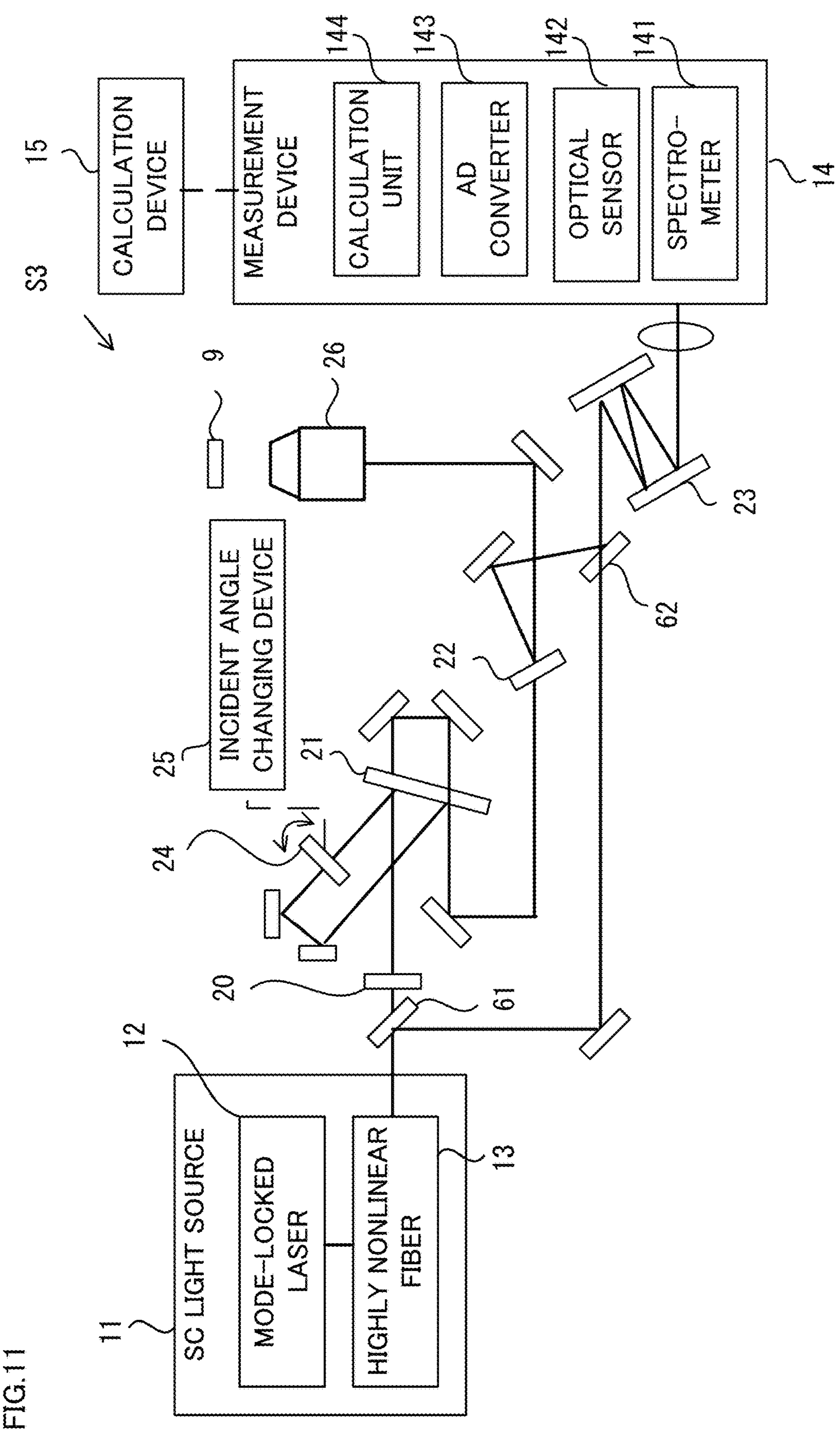
FIG. 11 is a block diagram of a Raman scattered light measuring system according to a third embodiment.

FIG. 11 is a configuration diagram of a Raman scattered light measurement system S3 according to the third embodiment. The Raman scattered light measurement system S3 in the present embodiment further includes a first optical element 61 that is a branching mirror and a second optical element 62 that is a half mirror, in addition to the configuration in the first embodiment. The first optical element 61 is disposed in front of the FPF20 that block visible light components, and extracts a part of the output light from the SC light source 11 as the reference light Lr. The reference light Lr is guided to the same optical path as the reflected light L4 by the second optical element 62, and reaches the measurement device 14 together with the reflected light L4. Hereinafter, the reflected light L4 and the reference light Lr are collectively referred to as evaluation light L5.

Focusing on a certain light receiving element of the optical sensor 142 included in the measurement device 14, the light incident on the light receiving element is the reflected light L4 having a specific wavelength and the reference light Lr. Therefore, each digital signal input to the calculation unit 144 is the intensity of light obtained by combining the reflected light L4 having a specific wavelength and the reference light Lr. Here, the light intensity of the reference light Lr having a certain wavelength $\lambda$ is Er, and the light intensity of the evaluation light L5 having a certain wavelength $\lambda$ is Es. It is further assumed that Er is sufficiently larger than Es. In this case, the intensity Ed of the light having the wavelength $\lambda$ detected by the computing unit satisfies the relationship shown in the following Equation 1.

$$\begin{aligned} Ed &= Er + Es + 2\sqrt{ErEs} \\ &\approx Er + 2\sqrt{ErEs} \end{aligned} \quad \text{(Equation 1)}$$

Here, since the light intensity Er of the reference light Lr is equal to the intensity Ed of the light having the wavelength $\lambda$ when the reflected light L4 is temporarily blocked, for example, the light intensity Er of the reference light Lr can be easily measured individually. Therefore, even if the reflected light L4 is weak, the calculation unit 144 can calculate the intensity of the reflected light L4 by satisfying the following two conditions. The first condition is that the magnitude of the second term on the right side of Equation 1 is sufficiently strong for the sensitivity of the optical sensor 142 included in the measurement device 14. The second condition is that the entire right side of Equation 1 is within the measurement range of the calculation unit 144, in other words, the measurement value of the calculation unit 144 is not saturated. This will be described in detail below.

The first condition will be described in detail. The component of the evaluation light L5 exists only in the second term on the right side in Equation 1. Therefore, the magnitude of the second term needs to be large enough for the sensitivity of the optical sensor 142, that is, the measurement resolution. The second term is desirably at least several times, preferably ten times or more, as large as the measurement resolution of the optical sensor 142. In order to satisfy the first condition, it is effective to increase the output of the SC light source 11 or to increase the ratio of the reference light Lr in the first optical element 61 which is a branching mirror.

Here, the second condition described above becomes a problem. As the light intensity Er of the reference light Lr increases, the optical sensor 142 is more likely to be saturated and measurement is hindered. Therefore, it is desirable that the optical sensor 142 is less likely to be saturated, more specifically, the saturation light detection intensity at a frequency at which the light intensity is to be calculated by the calculation unit 144 is high. That is, it is desirable to select the SC light source 11 and the optical sensor 142 included in the measurement device 14 in accordance with the wavelength to be calculated in the calculation unit 144.

According to the third embodiment described above, the following effects can be obtained. (8) The pump light Lp and the Stokes light Ls are generated from the SC light source 11 which is the same light source. The Raman scattered light measurement system S3 includes a first optical element 61 that splits the light output from the SC light source 11 to obtain the reference light, a second optical element 62 that guides the reflected light L4 and the reference light Lr to the same optical path as the evaluation light L5, a spectrometer 141 that spatially disperses the evaluation light L5 for each wavelength, an optical sensor 142 that receives the spatially dispersed evaluation light L5, and a calculation unit 144 that calculates the light intensity of the reflected light at at least one wavelength using the output of the optical sensor 142.

In each of the above-described embodiments and modifications, the configuration of the functional block is merely an example. Some functional configurations illustrated as separate functional blocks may be integrally configured, or a configuration represented by one functional block diagram may be divided into two or more functions. Further, a part of the functions of each functional block may be included in another functional block. The configurations described in the above-described embodiments and modifications are merely examples. For example, in FIGS. 1 and 8 to 11, a large number of optical elements which are not particularly described are illustrated. However, these optical elements are merely arranged so as not to cause contradiction in the optical path for convenience of drawing, and may be omitted or may be replaced.

The above-described embodiments and modifications may be combined with each other. Although various embodiments and modifications have been described above, the present invention is not limited to these contents. Other embodiments conceivable within the scope of the technical idea of the present invention are also included in the scope of the present invention.

REFERENCE SIGNS LIST

11 . . . SC light source
11-1 . . . first light source
11-2 . . . second light source
11-3 . . . third light source
14 . . . measurement device
15 . . . calculation device
20. . . . LPF
21 . . . First ULPF
22 . . . Second ULPF
23 . . . Third ULPF
24 . . . BPF
25 . . . Incidence angle changing device

26 . . . Objective
28-1 . . . first shutter
28-2 . . . second shutter
51 . . . excitation light source
52 . . . amplification medium
53 . . . dichroic mirror
61 . . . first optical element
62. . . . Second optical element
141 . . . Spectrometer
142 . . . Optical sensor
143 . . . AD converter
144 . . . calculation unit
L1. . . . SC light
L4 . . . reflected light
L5. . . . Evaluation Light
Lp . . . pump light
Lr . . . reference light
Ls . . . Stokes light
S, S2, S3. . . . Raman scattered light measurement system

The invention claimed is:

1. A Raman scattered light measuring system comprising;

a Stokes light generator configured to generate Stokes light with a broad band;

a pump light generator configured to generate pump light with a narrow band;

a wavelength changing unit configured to change center wavelength of the pump light in two different wavelengths;

a measurement device configured to measure a signal intensity at each frequency of reflected light obtained by irradiating a sample with the pump light and the Stokes light to obtain a signal intensity measurement value; and a calculation device configured to calculate a difference between the signal intensity measurement values for each frequency before and after the wavelength changing unit changes the center wavelength of the pump light.

2. The Raman scattered light measuring system according to claim 1, wherein the wavelength changing unit comprises a bandpass filter disposed in an optical path of the pump light and an operating mechanism configured to move or rotate the bandpass filter, wherein the wavelength changing unit changes the wavelength of the pump light by move or rotate the bandpass filter to change an incident angle of the pump light incident on the bandpass filter.

3. The Raman scattered light measuring system according to claim 2, wherein the operating mechanism is a galvanometer scanner.

4. The Raman scattered light measuring system according to claim 1, wherein the pump light and the Stokes light are light in an infrared region.

5. The Raman scattered light measuring system according to claim 1, wherein the pump light generator comprises: a first pump light generator configured to output first pump light having a center wavelength of a first wavelength; a second pump light generator configured to output second pump light having a center wavelength of a second wavelength; and a pump light selector configured to selectively irradiate sample with one of the first pump light and the second pump light.

6. The Raman scattered light measuring system according to claim 1, further comprising a pump light amplification unit configured to amplify an intensity of the pump light.

7. The Raman scattered light measuring system according to claim 1, wherein the pump light generation unit and the Stokes light generation unit comprise same light source, the Raman scattered light measuring system further comprising:

a first optical element branching the light output from the light source to obtain reference light;

a second optical element guiding the reflected light and the reference light to same optical path as evaluation light;

a spectrometer spatially dispersing the evaluation light for each wavelength;

an optical sensor configured to receive the evaluation light that is spatially dispersed; and a calculation device configured to calculate the intensity of the reflected light at least one wavelength using the output of the optical sensor.

8. A Raman scattering light measuring method comprising:

generating broadband Stokes light;

generating narrowband pump light;

changing a center wavelength of the pump light in two different wavelengths;

measuring a signal intensity for each frequency of reflected light obtained by irradiating a sample with the pump light and the Stokes light; and calculating a difference in the signal intensity for each frequency before and after the center wavelength of the pump light is changed;

measuring a signal intensity at each frequency of reflected light obtained by irradiating a sample with the pump light and the Stokes light to obtain a signal intensity measurement value; and calculating a difference between the signal intensity measurement values for each frequency before and after the wavelength changing unit changes the center wavelength of the pump light.

9. The Raman scattered light measuring method according to claim 8, wherein the wavelength of the pump light is changed to change an incident angle of the pump light incident.

10. The Raman scattered light measuring method according to claim 8, wherein the pump light and the Stokes light are light in an infrared region.

11. The Raman scattered light measuring method according to claim 8, further comprising amplifying an intensity of the pump light.

12. The Raman scattered light measuring method according to claim 8, wherein the pump light and the Stokes light are generated with one light source, and the Raman scattered light measuring method further comprises:

branching light that is output from the light source to obtain reference light;

guiding the reflected light and the reference light to same optical path as evaluation light;

dispersing the evaluation light for each wavelength;

receiving the evaluation light that is spatially dispersed; and calculating the intensity of the reflected light at least one wavelength using the received evaluation light.

* * * * *